(12) United States Patent
Wiggins

(10) Patent No.: US 10,856,674 B2
(45) Date of Patent: Dec. 8, 2020

(54) MULTI-POSITION MOUNTING SYSTEM FOR WALL PANELS AND HANGINGS

(71) Applicant: Robert E Wiggins, Houston, TX (US)

(72) Inventor: Robert E Wiggins, Houston, TX (US)

(73) Assignee: Robert Ellis Art & Design, Houston, TX (US)

( * ) Notice: Subject to any disclaimer, the term of this patent is extended or adjusted under 35 U.S.C. 154(b) by 0 days.

(21) Appl. No.: 16/432,014

(22) Filed: Jun. 5, 2019

(65) Prior Publication Data

US 2019/0284801 A1    Sep. 19, 2019

Related U.S. Application Data

(63) Continuation of application No. 15/653,427, filed on Jul. 18, 2017, now Pat. No. 10,349,759.

(51) Int. Cl.
| | |
|---|---|
| *A47G 1/16* | (2006.01) |
| *G09F 7/18* | (2006.01) |
| *G09F 19/22* | (2006.01) |
| *F16B 5/06* | (2006.01) |
| *E04B 2/30* | (2006.01) |
| *E04B 2/78* | (2006.01) |
| *E04H 12/22* | (2006.01) |
| *F16B 5/07* | (2006.01) |
| *F16B 15/00* | (2006.01) |

(52) U.S. Cl.
CPC ............. *A47G 1/16* (2013.01); *A47G 1/1606* (2013.01); *E04B 2/30* (2013.01); *E04B 2/7881* (2013.01); *E04H 12/2261* (2013.01); *G09F 7/18* (2013.01); *G09F 19/22* (2013.01); *F16B 5/0642* (2013.01); *F16B 5/07* (2013.01); *F16B 2015/0076* (2013.01); *G09F 2007/1813* (2013.01)

(58) Field of Classification Search
CPC ....... E04B 2/30; E04B 2/7881; A47G 1/1606; E04H 12/2261; G09F 7/18; G09F 19/22; G09F 2007/1813; F16B 5/0642; F16B 5/07

See application file for complete search history.

(56) References Cited

U.S. PATENT DOCUMENTS

| | | | |
|---|---|---|---|
| 5,588,240 A | 12/1996 | Zilliox | |
| 5,605,313 A * | 2/1997 | Erickson | ............... A47G 1/1606 |
| | | | 248/467 |
| 6,719,260 B1 * | 4/2004 | Hart | ....................... A47G 1/168 |
| | | | 248/466 |

(Continued)

*Primary Examiner* — Anita M King
(74) *Attorney, Agent, or Firm* — Kaspar Law Company, LLC; Scott R. Kaspar

(57) ABSTRACT

A multi-position mounting system is provided for securing a wall panel or hanging to a vertical wall, the wall panel or hanging having a front surface facing away from the wall, a back surface opposite the front, and one or more side surfaces connecting the front and back surfaces. In one embodiment, the multi-position mounting system includes a notch disposed in the back surface of the wall panel, the notch having at least three edges, each edge defining a separate sidewall surface. The notch is configured to secure to a bracket affixed to the vertical wall, the bracket configured to separately mate with each sidewall surface of the notch, wherein mating the bracket with an adjacent sidewall surface of the notch slightly rotates the wall panel with respect to the vertical wall.

16 Claims, 4 Drawing Sheets

(56) References Cited

U.S. PATENT DOCUMENTS

| | | | |
|---|---|---|---|
| 8,042,308 B2 | 10/2011 | Sullivan et al. | |
| 8,342,472 B2 | 1/2013 | Gaudron et al. | |
| 8,641,001 B2 * | 2/2014 | Heffernon | F16M 11/041 248/224.8 |
| 8,899,538 B2 * | 12/2014 | Wertz | G09B 23/36 248/225.11 |
| 9,395,044 B2 * | 7/2016 | Cheng | A47G 1/1613 |
| 10,349,759 B2 * | 7/2019 | Wiggins | E04H 12/2261 |
| 10,709,269 B2 * | 7/2020 | Franco | A47G 1/1606 |
| 2003/0038222 A1 * | 2/2003 | Holmes | A47G 1/1606 248/475.1 |
| 2008/0251670 A1 * | 10/2008 | Ho | F16B 45/00 248/304 |
| 2012/0112022 A1 * | 5/2012 | Cheng | A47G 25/10 248/205.3 |
| 2015/0259903 A1 | 9/2015 | Gosling et al. | |

\* cited by examiner

MULTI-POSITION MOUNTING SYSTEM FOR WALL PANELS AND HANGINGS

CROSS-REFERENCE TO PRIOR APPLICATIONS

This application is a continuation of, and claims the benefit of priority to, U.S. patent application Ser. No. 15/653,427, filed on Jul. 18, 2017, which is incorporated by reference herein in its entirety.

TECHNICAL FIELD

The present invention relates to a mounting system for wall panels and hangings, including picture frames and other hangings affixed to a vertical wall. More particularly, the present invention relates to a multi-position mounting system that provides for the expedient mounting and/or reconfiguration of wall panels and hangings, and any other such hanging that secures to a vertical wall.

BACKGROUND

There exists in the art various clips for mounting wall panels and hangings, the clips being configured to secure the wall panel or hanging to a vertical wall in a particular configuration.

For example, clips commonly referred to as "Z-clips," such as those manufactured by Eagle Mouldings of Loretto, Minn., have long been used to secure a wall panel or hanging to a wall. In this setting, a user attaches a Z-clip to the wall using conventional screws or nails. The Z-clip includes an upper clip portion that is disposed parallel to but slightly away from the wall, and the clip engages with a fitting that is attached to the wall panel or hanging. As such, the user has to determine the proper location of the Z-clip on the wall as well as the fitting on the wall panel or hanging in order to hang the wall panel or hanging in a particular desired location.

One disadvantage of a conventional Z-clip mounting system is that a Z-clip only provides for one hanging configuration. In other words, if a user desires to mount the wall panel or hanging in a slightly different configuration, the user must remove and reposition the Z-clip and fitting. This requires the same steps and time consuming procedure as mounting the wall panel or hanging in the first instance.

Some prior art mounting systems provide for two mounting configurations. For example, U.S. Pat. No. 8,042,308 to Sullivan et al. discloses a clip for holding a picture frame to a vertical wall in which a protruding surface on the picture frame engages with the clip, which is secured to the wall, to hold the picture frame against the wall. The clip and protruding surface are magnetically mated such that a user can remove the picture frame, rotate the picture frame about one-hundred and eighty degrees, and then reengage the protruding surface with the clip. But even still, the mounting system disclosed by the Sullivan patent requires numerous mounting components that must be secured to the picture frame and the wall, the installation of which is time consuming and may be too difficult for some users. Even still, the mounting system disclosed by the Sullivan patent only provides for two mounting configurations.

SUMMARY OF THE INVENTION

According to one non-limiting aspect of the present disclosure, an example embodiment of a multi-position mounting system is described. The exemplar multi-position mounting system is provided for securing a wall panel or hanging to a vertical wall, the wall panel or hanging having a front surface facing away from the wall, a back surface opposite the front, and one or more side surfaces connecting the front and back surfaces. The exemplar multi-position mounting system includes a notch disposed in the back surface of the wall panel, the notch having at least three edges, each edge defining a separate sidewall surface. The notch is configured to secure to a bracket affixed to the vertical wall, the bracket configured to separately mate with each sidewall surface of the notch, wherein mating the bracket with an adjacent sidewall surface of the notch slightly rotates the wall panel with respect to the vertical wall.

According to another non-limiting aspect of the present disclosure, an example embodiment of a multi-position mounting system is described. The exemplar multi-position mounting system is provided for securing a wall panel or hanging to a vertical wall, the wall panel or hanging having a front surface facing away from the wall, a back surface opposite the front, and one or more side surfaces connecting the front and back surfaces. The exemplar multi-position mounting system includes an octagonal-shaped notch disposed in the back surface of the wall panel, the notch having eight edges, each edge defining a separate sidewall surface, wherein each sidewall surface includes a recessed portion. The notch is configured to secure to a bracket affixed to the vertical wall, the bracket configured to separately mate with the recessed portion of each of the eight sidewall surfaces of the notch to create eight mounting configurations, wherein mating the bracket with an adjacent sidewall surface of the notch slightly rotates the wall panel with respect to the vertical wall.

According to yet another non-limiting aspect of the present disclosure, an example embodiment of a multi-position mounting system is described. The exemplar multi-position mounting system is provided for securing a wall panel or hanging to a vertical wall, the wall panel or hanging having a front surface facing away from the wall and a back surface opposite the front. The exemplar multi-position mounting system includes an octagonal-shaped ring affixed to the back surface of the wall panel, the ring having eight edges, each edge defining a separate sidewall surface, wherein each sidewall surface includes a recessed portion. The ring is configured to secure to a bracket affixed to the vertical wall, the bracket configured to separately mate with the recessed portion of each of the eight sidewall surfaces of the ring to create eight mounting configurations, wherein mating the bracket with an adjacent sidewall surface of the ring slightly rotates the wall panel with respect to the vertical wall.

Additional features and advantages are described herein, and will be apparent from the following Detailed Description and the figures.

BRIEF DESCRIPTION OF THE DRAWINGS

Features and advantages of the multi-position mounting system described herein may be better understood by reference to the accompanying drawings in which.

The reader will appreciate the foregoing details, as well as others, upon considering the following Detailed Description of certain non-limiting embodiments of multi-position mounting systems according to the present disclosure. The reader may also comprehend certain of such additional details upon using the multi-position mounting systems described herein.

DETAILED DESCRIPTION

The present disclosure, in part, is directed to multi-position mounting systems for securing wall panels and/or hangings to a vertical wall.

As used herein, a wall panel or hanging includes acoustic and decorative wall panels that may be secured to a wall, for certain functional, decorative, or other purposes. The present invention also is suitable for use with wall hangings, such as picture frames, decorative wall hangings, and any other hanging that may be secured to a vertical wall.

Wall panels or hangings used in connection with the present invention include a front surface facing away from the vertical wall, a back or wall-facing surface opposite the front surface, and in many instances, one or more side surfaces that connect the front and back surfaces.

Figure 1:
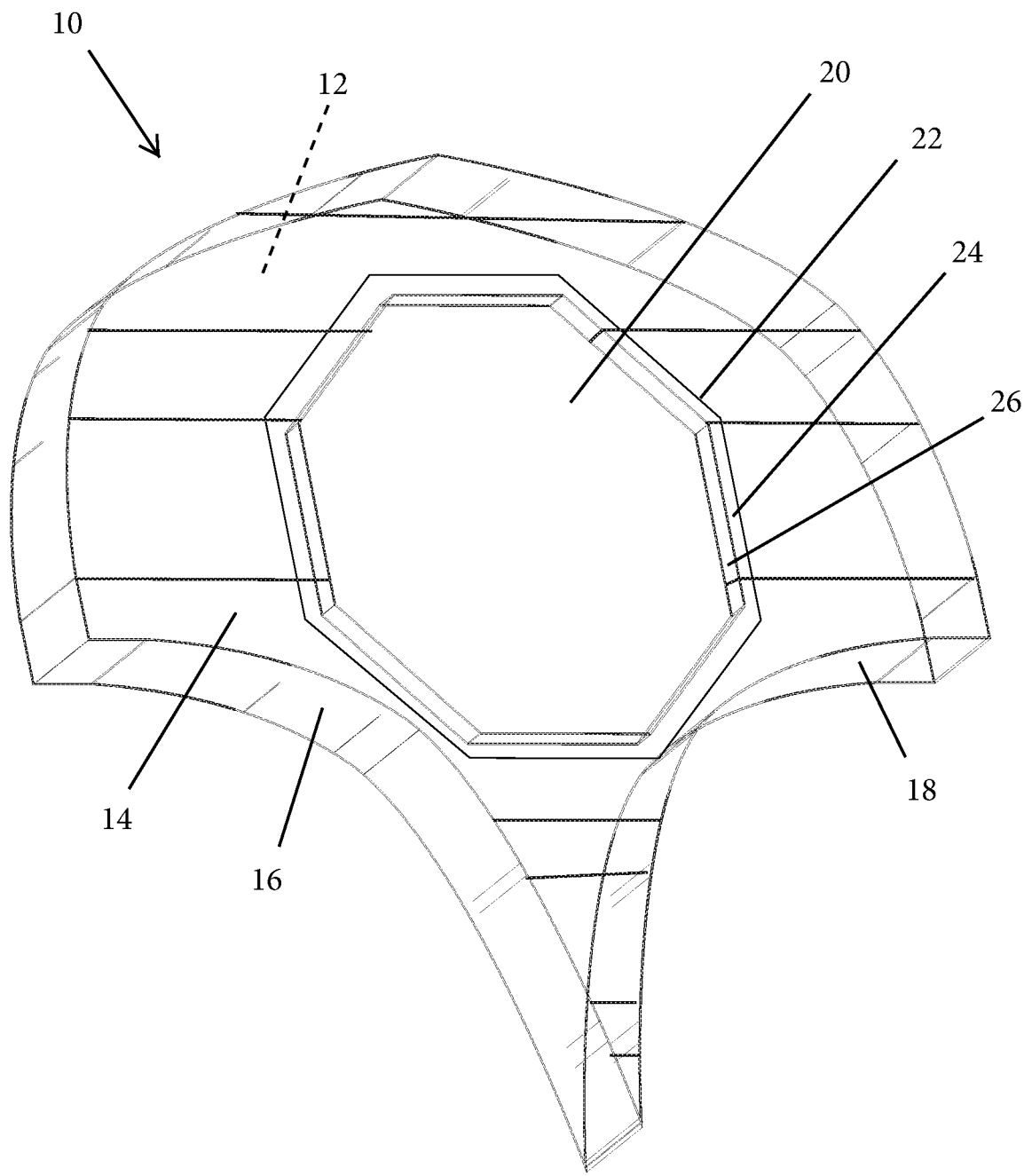
FIG. 1 is a perspective view of an exemplary wall panel incorporating an embodiment of the multi-position mounting system of the present invention.

As shown in FIG. 1, a wall panel 10 is disclosed. The wall panel 10 includes a front surface 12 (shown in hidden in FIG. 1), a back or wall-facing surface 14, and side surfaces 16 and 18. The wall panel 10 shown in FIG. 1 is exemplary. The wall panel 10 or hanging may be of any shape or size. The unique curves and surfaces shown on the wall panel 10 in FIG. 1 are for illustrative purposes only, and the mounting system of the present invention may be adapted for use with any number of wall panels, wall hangings, picture frames, and any other hanging that may be secured to a vertical wall.

FIG. 1 further shows one embodiment in which a notch 20 is disposed in the back surface 14 of the wall panel 10. The notch 20 is comprised of at least three edges 22, which define sidewall surfaces 24. The sidewall surfaces 24 provide depth to the notch 20. In some embodiments, the depth ranges between one-eighth and one inch. Preferably, the depth is about one-quarter inch.

The notch 20 is comprised of at least three edges 22 and may be any shape or configuration, such as triangular-shaped (3 edges), square or rectangular-shaped (4 edges), pentagonal shaped (5 edges), hexagonal shaped (6 edges), heptagonal shaped (7 edges), octagonal shaped (8 edges), and so forth.

Figure 2:
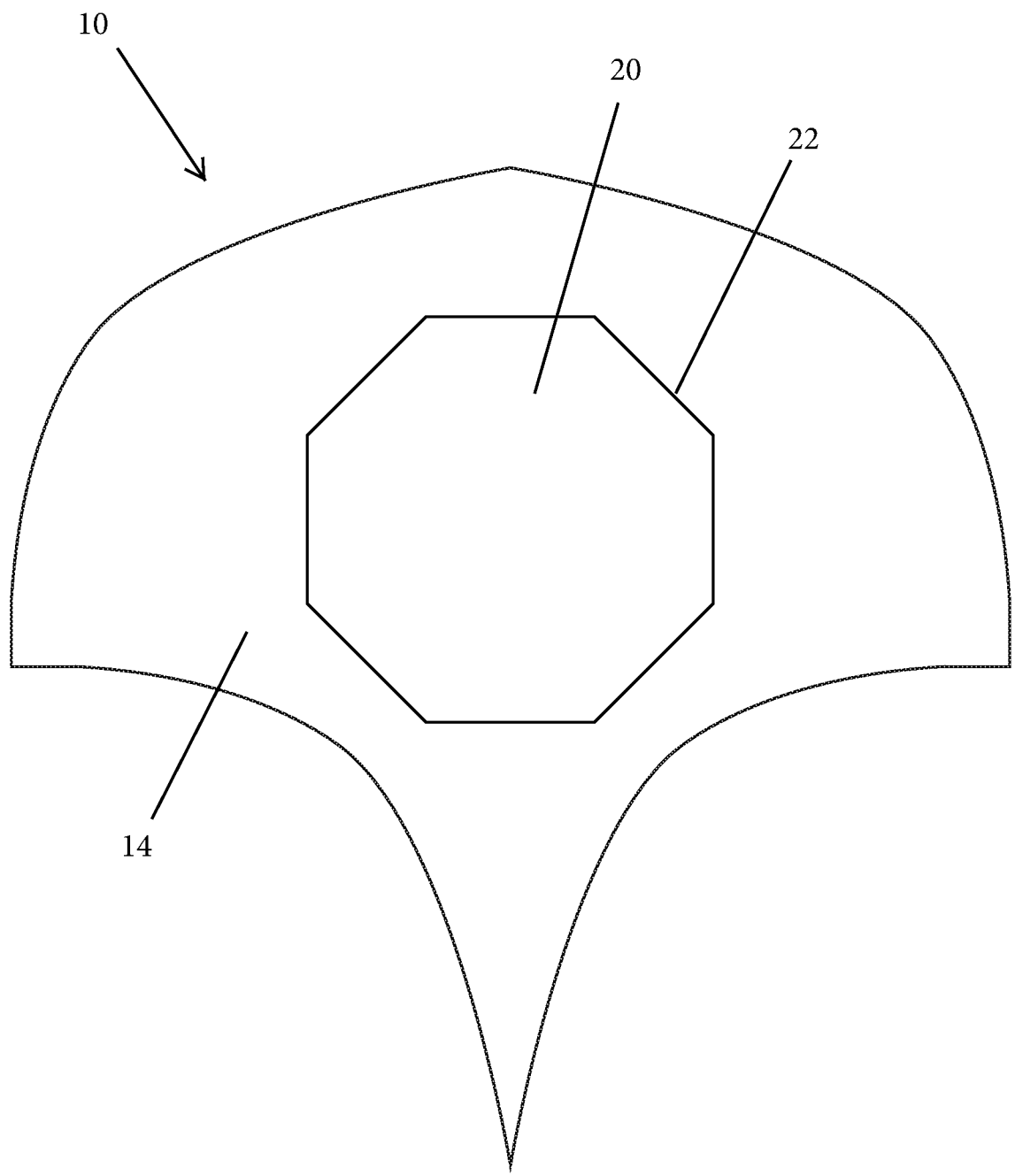
FIG. 2 is a back, or wall-facing, view of the multi-position mounting system of FIG. 1.
Figure 3:
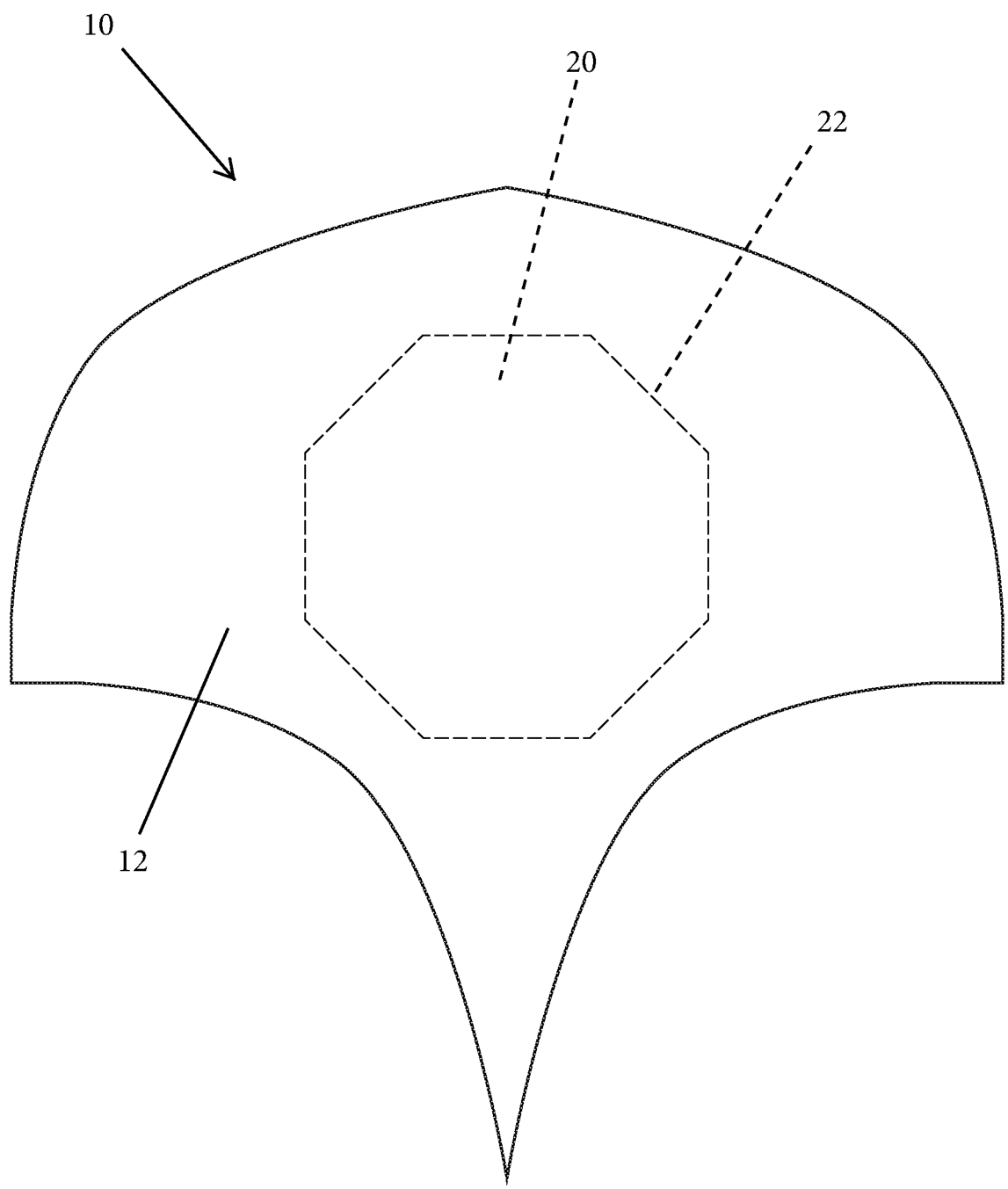
FIG. 3 is a front view of the multi-position mounting system of FIG. 1.

As shown in FIGS. 2 and 3 (in hidden view), in one embodiment, the notch 20 is octagonal shaped and has eight edges 22. The major axis of the octagonal shaped notch 20 is between two and six inches in length. Preferably, the major axis of the octagonal shaped notch 20 is about four inches in length.

The notch 20, in another embodiment, may be a ring or protrusion extending from the back surface 14 of the wall panel 10. The ring 20 may be affixed to the back surface 14 of the wall panel 10, such as by using glue, adhesive, double-sided tape, or hardware such as screws or nails. Alternatively, the ring 20 may be a protrusion of the wall panel 10 extending from the back surface 14.

Figure 4:
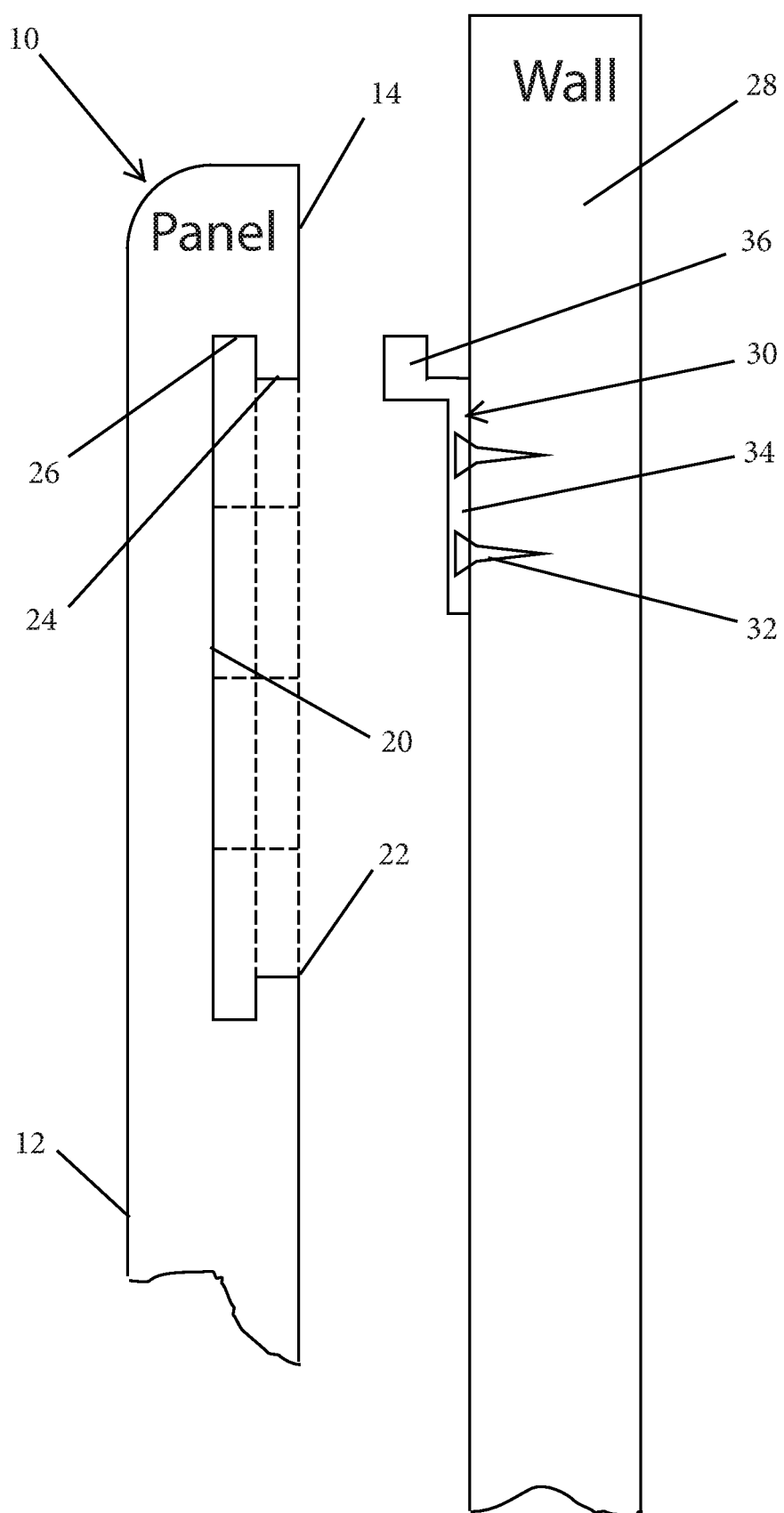
FIG. 4 is side view of the multi-position mounting system of FIG. 1, which is shown adjacent to a vertical wall surface, prior to engagement with said vertical wall surface.

Each sidewall surface 24 of the notch (or ring) 20 is configured to secure the wall panel 10 to a vertical wall 28 by mating with a bracket 30. As shown in FIG. 4, a bracket 30 is secured to a wall 28 by fasteners 32, which may include nails or screws. Bracket 30 can be any type of bracket or protrusion, such as a small block of wood attached to the wall 28 by one or more screw 32. As shown in FIG. 4, in one embodiment, bracket 30 is similar to a Z-clip and includes a main body portion 34 that secures to the wall 28, and a includes a clip portion 36 that extends from the top of the bracket 30 and is parallel to but away from the wall 28.

The sidewall surface 24 of the notch 20 may include, in one embodiment, a recessed portion 26, as shown in FIG. 4. The recessed portion 26 is configured to receive the clip portion 36 of the bracket 30 when the wall panel 10 is secured against the wall 28. In this configuration, the sidewall surface 24 rests against the bracket 30 to hold the wall panel 10 against the wall 28, and the clip portion 36 of the bracket 30 engages within the recessed portion 26 of the sidewall 24 of the notch 20 to secure the wall panel 10 and prevent the wall panel 10 from easily disengaging from the wall 28.

In operation or use, a user attaches bracket 30 to the wall 28 and then secures wall panel 10 to the wall 28 via the notch 20 and, more particularly, by mating a sidewall surface 24 with the bracket 30. This provides for the expedient mounting of a wall panel 10 against a wall 28.

This may be more expediently accomplished by the use of a paper template that includes a graphical representation of the notch 20, as it would interface with the bracket 30, in which a user tapes or otherwise temporarily secures the template to a wall 28 in a location where the user desires to mount or hang a wall panel or hanging 10. With the template in place, the user can mark or pre-drill holes into the wall 28 for affixing the bracket 30 to the wall 28. Thereafter, the user may remove the template from the wall 28, and mount or hang a wall panel or hanging 10. Once the bracket 30 is affixed to the wall 28, the wall panel or hanging 10 can be secured to the bracket 30 or rotated as desired such that the wall panel or hanging 10 can be mounted or re-mounted in another configuration with respect to the wall 28, as provided by the notch 20 and sidewall surfaces 24.

Because of the shape of the notch 20 and the presence of more than three edges 22, there are at least three sidewall surfaces 24 that may be configured to separately mate with the bracket 30. This provides for mounting the wall panel 10 in at least three configurations. Specifically, a user may rotate the wall panel 10 slightly to mate an adjacent sidewall surface 24 with the bracket 30.

In the particular embodiment shown in FIG. 1, in which the notch 20 is octagonal shaped and has eight edges 22 that define eight sidewall surfaces 24, a user can mount the wall panel 10 in any one of eight configurations. That is, the user can rotate the wall panel 10 by about forty-five degrees to mate an adjacent sidewall surface 24 with the bracket 30. This may be particularly useful in the installation of wall panel systems in which providing a user with at least three, and preferably eight, configurations or degrees of freedom permits the expedient installation of a wall panel system.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A multi-position mounting system for securing a wall panel to a vertical wall perpendicular to a floor, the wall panel having a front surface facing away from the wall, a back surface opposite the front, and one or more side surfaces connecting the front and back surfaces, the multi-position mounting system comprising:

a bracket affixed to the vertical wall, the bracket configured to secure the wall panel to the vertical wall, the bracket having a clip portion extending upwardly from the bracket, the clip portion positioned parallel to but not in contact with the vertical wall; and a notch disposed in the back surface of the wall panel for mating with the bracket, the notch having a plurality of edges, each edge defining a separate orientation of the wall panel with respect to the bracket and the vertical wall, each edge of the notch having a sidewall portion perpendicular to and in contact with the vertical wall and a recessed portion disposed adjacent to the sidewall portion, the recessed portion configured to receive and engage with the clip portion of the bracket.

2. The multi-position mounting system of claim 1 wherein the wall panel is an acoustic wall tile.

3. The multi-position mounting system of claim 1 wherein the wall panel is a picture frame.

4. The multi-position mounting system of claim 1 wherein the wall panel is a decorative wall hanging.

5. The multi-position mounting system of claim 1 wherein the notch has eight edges generally forming an octagonal shape, each edge joined to a sidewall surface configured to separately mate with the bracket.

6. The multi-position mounting system of claim 5 wherein mating the bracket with the adjacent sidewall surface rotates the wall panel about forty-five degrees.

7. The multi-position mounting system of claim 5 wherein the notch has a major axis between two and six inches in length.

8. The multi-position mounting system of claim 1 wherein the bracket has a main body portion and a clip portion protruding from an upper end of the main body portion, the clip portion configured to separately mate with each sidewall surface of the notch.

9. The multi-position mounting system of claim 8 wherein each sidewall surface of the notch has a recessed portion configured to receive the clip portion of the bracket when the bracket mates with the sidewall surface.

10. The multi-position mounting system of claim 1 wherein the sidewall surface has a depth between one-eighth and one inch.

11. A multi-position mounting system for securing a wall panel to a vertical wall perpendicular to a floor, the wall panel having a front surface facing away from the wall, a back surface opposite the front, and one or more side surfaces connecting the front and back surfaces, the multi-position mounting system comprising:

a bracket affixed to the vertical wall, the bracket having a clip portion configured to secure the wall panel to the vertical wall, the clip portion positioned parallel to but not in contact with the vertical wall;

an octagonal-shaped notch disposed in the back surface of the wall panel, the notch having eight edges, each edge defining a separate sidewall surface perpendicular to and in contact with the vertical wall, wherein each sidewall surface of the notch has a recessed portion disposed proximate to the sidewall portion and opposite to the edge of the sidewall portion in contact with the vertical wall, the recessed portion configured to receive and engage with the clip portion of the bracket;

wherein mating the bracket with an adjacent sidewall surface of the notch slightly rotates the wall panel with respect to the vertical wall.

12. The multi-position mounting system of claim 11 wherein the wall panel is an acoustic wall tile.

13. The multi-position mounting system of claim 11 wherein the wall panel is a picture frame.

14. The multi-position mounting system of claim 11 wherein the wall panel is a decorative wall hanging.

15. The multi-position mounting system of claim 11 wherein the notch has a major axis between two and six inches in length.

16. The multi-position mounting system of claim 11 wherein the sidewall surface has a depth between one-eighth and one inch.

\* \* \* \* \*